UNITED STATES PATENT OFFICE 2,365,694

MEDICAMENT COMPOSITIONS AND PROCESSES OF PREPARING SAME

Robert Bruce Goodrich, Waterford, Conn., assignor of one-half to Roy F. Steward, Meriden, Conn.

No Drawing. Application January 24, 1940, Serial No. 315,431

14 Claims. (Cl. 167—70)

This invention relates to medicament compositions and processes of preparing same. More particularly, it relates to novel iodine-containing compositions suitable for local application, that are easily prepared and in a form convenient for accomplishing such application effectively and without the disadvantages and objections attending the use of the usual solutions, tinctures, ointments and the like.

In accordance with the principles of the invention, the novel composition comprises elemental iodine in intimate association with a carrier medium through which the iodine is dispersed and by which it is held or fixed in form and condition convenient and effective for application; said carrier consisting wholly or in substantial part of an inorganic compound containing water of hydration or constitution (i. e. combined water) derived, in passing from a lower state of chemical hydration (e. g. substantially dehydrated condition), from an aqueous dispersion of iodine admixed with the carrier in the process of preparation. The term dispersion is herein used generically to include both colloidal dispersions and true solutions.

The process of the invention therefore involves essentially reacting between an aqueous dispersion of iodine and a suitable carrier medium of the character described which does not react with iodine, but which takes up water from said dispersion and fixes it as water of hydration, the iodine being at the same time uniformly dispersed throughout the hydrated carrier medium and held or fixed in a stable association therewith which is extremely intimate and evidently different from a mere mechanical mixture, but which is nevertheless such that the iodine is immediately dispersible into water when the novel composition is contacted therewith. Dependent upon the proportioning of the constituents of the reaction mixture, the taking up of the sensible moisture content of the iodine dispersion and the resultant chemical hydration of the carrier medium may both be substantially complete, or either may be incomplete. If both are complete, or if the proportion of carrier medium so preponderates that its hydration is incomplete, the composition resulting from the reaction is solid or substantially so, and virtually free of sensible moisture. The invention is usually most advantageously embodied in compositions that are substantially solid and dry, although this is not to be understood as excluding a moderate moisture content in addition to the water of hydration. Moreover, it has been found particularly desirable in actual practice to employ, for fixing or combining the aqueous component of the iodine dispersion, a hydratable carrier medium component of a type that, in passing from a state of dehydration or relatively low degree of hydration to a higher degree of hydration, "sets" or hardens much as does plaster of Paris.

The principles of the invention are applicable to the preparation of various novel iodine compositions differing more or less widely from each other in respect to specific formula and physical form, yet all possessing the desirable characteristics generally referred to hereinabove.

A specific embodiment of the invention, in which iodine is an antiseptic constituent of the medicament composition and which affords particularly important practical advantages, consists in associating iodine with a carrier medium having not only the general identifying characteristics already mentioned but also possessing, in itself, a desirable therapeutic or curative action supplementing the antiseptic action of the iodine. Such a carrier medium is alum, so commonly employed in the form of the well known styptic stick or pencil, the use of which in barber shops, for example, is now quite generally frowned upon and in many cases restricted or banned by health authorities because of the possibility of its spreading infection. Association of a potent antiseptic such as iodine with alum in a styptic stick or pencil, in accordance with the principles of the invention, gives a product not only free from the objections inherent in the ordinary styptic pencil but possessing desirable properties that render it far more useful and effective.

In employing alum as the base or carrier medium in the novel composition, an alum of either the ammonium or potassium type may be used, for example, and it should be in the form of "burnt" alum ("exsiccated alum") when compounding the mixture. Burnt alum results when alum is suitably heated under controlled conditions, to drive off practically all water of crystallization. The dehydrating reaction in the case of ammonium alum is as follows:

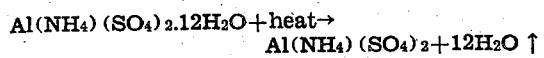

$$Al(NH_4)(SO_4)_2.12H_2O + \text{heat} \rightarrow Al(NH_4)(SO_4)_2 + 12H_2O \uparrow$$

The reaction is reversible, so that adding water to burnt alum results in chemically hydrating it to a degree dependent upon the amount of available moisture present, up to complete restoration of the 12 molecules of water fixed therein as water of crystallization or constitution. The completely hydrated alum may contain some additional moisture, apart from the combined water, and still remain sensibly dry. In this hydration of the burnt alum, considerable heat is evolved and the material goes through a period or stage of "setting" somewhat comparable to the action of a mixture of water and plaster of Paris.

In carrying out the present invention for the production of the aforesaid novel iodine-alum composition, the water for the hydration of the burnt alum is derived at least in part from a solution or tincture of iodine employed in mixing the ingredients. For optimum results, the total amount of water available in the mix should be only sufficient to effect the desired hydration and setting action, and to give a final product that is substantially solid and sensibly dry. As a matter of added convenience in molding or otherwise shaping a body of the composition into desired form, and in order to give the shaped body greater mechanical strength and coherence, it is frequently desirable to include a suitable binder of some kind, such as gum arabic for example, in the composition; but this is not to be regarded as indispensable.

Ordinarily, the best aqueous dispersion of iodine to employ is a solution of iodine in water containing a soluble iodide (e. g. potassium iodide). This solution may be of any convenient concentration, and the quantity incorporated in the reaction mix should be such as will ensure the desired percentage of available or active iodine in the reaction product, and at the same time will provide an amount of water which, together with any water otherwise added to the mix, is substantially just sufficient to completely hydrate the burnt alum. If a binder in aqueous solution is used, then account must be taken of the water added with the binder when mixing the ingredients. It is advisable to have an excess of soluble iodide in the iodine solution for the reason, among others, that this increases the tendency for the elemental or free iodine to be held in relatively fixed or stable condition in association with the hydrated alum in the final product, presumably in the form of the tri-iodide complex ion. This greatly aids in preventing or sufficiently suppressing mechanical separation of elemental iodine in said product, while at the same time it ensures its instant availability, as well as that of the alum, by aqueous dispersion upon contact with sensible moisture, as in applying the composition to a cut or other open wound. In this connection it is believed probable that the water of crystallization or constitution of the associated carrier medium or base plays a part in maintaining the aforesaid relation between the iodine and the potassium iodide.

It will be seen that the composition of the novel type to which the present invention is directed is produced by reaction in a mixture in which one or more of the ingredients is a hydrated compound that, initially, is dehydated or relatively so (the compound being in either case generically definable as in a relatively low state of hydration), and is capable of utilizing the water component of a solution or dispersion of iodine in undergoing hydration, thereby "fixing" such water in a more highly hydrated form of said compound. The iodine is added to the mix in the same active form in which it will eventually be applied. Effecting the chemical hydration of the dehydrated carrier by means of the aqueous dispersion of iodine in the manner described herein, results in a product wherein the iodine is uniformly distributed through and blended with the carrier in intimate and stable association with the water of constitution or hydration of the carrier. Whatever may be the precise nature of this intimate association, physical or chemical, it is an important characteristic of the novel composition of the invention differentiating it positively from a mere mechanical mixture of solid iodine with solid carrier material.

In preparing an iodine-alum composition within the invention suitable for use in a styptic pencil, the detailed procedure may desirably be as follows, the proportions of the ingredients specified being by weight:

An iodine solution is prepared by dissolving 25 parts of potassium iodide in 50 parts of water and then dissolving 25 parts of iodine in this solution. It is of course permissible to alter these quantities depending upon the concentration of available iodine desired in the final product, but the foregoing proportions give a stock solution of convenient concentration for general use. It is to be noted that the proportion of potassium iodide in this solution relative to the free or elemental iodine is somewhat higher than is necessary to ensure fixing the iodine in the tri-iodide complex ion. With 30 parts of the iodine solution are then mixed 30 parts of a binder solution consisting of equal parts of gum arabic and water. To the resultant mixture, 40 parts of powdered burnt alum are added gradually, yet rapidly, and thoroughly mixed until a smooth paste is formed. This step should be performed rapidly in order to minimize the amount of alum going into solution.

The hydration of the burnt alum occurring during the formation of the smooth paste is accompanied by the evolution of considerable heat, and in order to prevent loss of iodine by volatilization it is therefore necessary to cool the mixture during this operation. The resultant smooth paste is immediately molded or cast into the desired sticks or pencils, and may then be allowed to air-dry in the mold for a short time. During this time the mixture sets to a hard, dry mass which is then removed from the mold. The particular mode of mixing described results in a somewhat retarded rate of setting, which is advantageous because it allows a reasonable time for performing the molding or casting operation. The shaped solid product can be packaged in any suitable type of container or holder, of paper, cardboard or other suitable material, thus doing away with the awkwardness and messiness of handling an iodine solution or tincture.

The water solubility of the product which, when prepared as in the example just given, contains approximately 7.5% elemental iodine uniformly dispersed therethrough, is extremely high. Therefore, either moistening the styptic pencil or the wound to which it is applied, or even the moisture of the wound itself, provides sufficient water to dissolve an amount of the composition adequate for the requisite antiseptic and styptic action. Such application of the pencil to the wound actually results in forming, directly in situ, an iodine solution of the proper concentration, thus avoiding a danger well known to be inherent in the use of iodine solutions or tinctures of the prior art which, because of their liability to become unduly concentrated upon long standing through evaporation of the solvents employed, may cause iodine burns if not used within a relatively short time after being prepared. The styptic action of the product, occurring simultaneously with its antiseptic action, is an important advantage since the rapid coagulation of the blood reduces the usual unpleasant bloodstains and greatly reduces the time wasted and annoyance incurred in waiting for the usual cut to stop bleeding. If desired, the styptic stick or pencil may be provided with a coating of paraffin or the like as a protection against accidental contact with moisture.

Instead of performing the mixing steps in the manner described in the example above given, the iodine solution, with or without the addition of a binder, may be added to the finely powdered burnt alum in any suitable manner. Thus, the alum may be spread out in a thin layer and then sprayed with the iodine solution in such a way as to ensure uniform distribution of the solution throughout the alum layer. Much heat is evolved and cooling is necessary, as before, to prevent loss of iodine. When the procedure is carried out in this way, the hydration of the powdered alum is so rapid that the product ordinarily does not pass through a distinct stage of pastiness as in the first example described, but sets very quickly. The resultant set and dry product, if it is to be employed in the form of a styptic stick or pencil, may be molded into the desired form with the aid of heat and pressure, with or without the use of a binder. However, where a shaped body of the composition is to be made, incorporation of a binder into the initial mix, as described in the example first given, is usually desirable because it simplifies the molding process and also renders the molded composition tougher and less brittle.

Instead of employing the iodine-alum product in the form of a pencil or other shaped body, it may be used in suitably pulverulent condition as an antiseptic and styptic dusting powder. In this embodiment of the invention, the inclusion of a binder in the composition is ordinarily superfluous and unnecessary.

Where it is desired that the iodine composition shall have an elemental iodine content approximating 2.5%, for example, the proportion of the ingredients of the initial mix may be readily adjusted to achieve this. Thus, employing the same stock solution of iodine as before, 10 parts of this solution plus 10 parts of water, together with 30 parts of the binder solution containing equal parts of gum arabic and water, are used in conjunction with 50 parts of powdered burnt alum, the mixing of the ingredients being effected in either of the specific ways already described hereinabove. The final product, containing about 2.5 per cent available elemental iodine, is effective both as an antiseptic and as a styptic, but is lighter in color than the 7.5 per cent product. Actual determination of the antiseptic power of specimens of both the 2.5 and 7.5 per cent products has shown them to possess a phenol coefficient of 7.5, which is a relatively high rating. Such products are of great value for first-aid treatment and are exceedingly convenient to carry and apply whether in pencil or other form.

Where the novel composition is intended primarily for styptic purposes rather than for highly antiseptic action, the available iodine content may be as low as 0.5 per cent, for example, this content being sufficient to render the alum moderately antiseptic but insufficient to produce a pronounced iodine stain when applied.

Instead of ammonium or potassium alum as the carrier medium or base, it is feasible to use some other salt or a mixture of salts, most desirably water soluble, obtainable in substantially dehydrated form and capable of being chemically hydrated to a normally stable and substantially dry hydrate, such as the other various available alums, aluminum sulphate, magnesium sulphate or Epsom salts, borax, or the like.

The novel compositions of the invention may also include, in addition to the iodine and the carrier medium proper, filler materials which are chemically inert toward the iodine and which may or may not in themselves possess therapeutic value. Zinc oxide is an example of a suitable filler which can be used in this connection and which possesses healing properties. Various binders other than gum arabic may be employed, but a water soluble or dispersible gum of some kind is generally most suitable.

What is claimed is:

1. The process of preparing an iodine-containing composition for local application, which comprises subjecting to the hydrating action of a separately prepared aqueous dispersion of iodine and a binder, a substantially dehydrated water-soluble inorganic salt which undergoes setting in passing to a higher state of hydration and which is chemically inert toward iodine, and forming a shaped body of the resultant mixture before the setting action is complete.

2. The process of preparing an iodine-containing composition for local application, which comprises subjecting a hydratable inorganic water-soluble sulphate in a relatively low state of hydration, to the hydrating action of a separately prepared aqueous dispersion of iodine, thereby fixing water of said dispersion in said medium as water of constitution or hydration and dispersing the iodine through said medium, said medium being chemically inert toward iodine, the proportioning of the liquid and solid materials employed being such as to give a substantially solid final product.

3. The process defined in claim 2, wherein said sulphate is selected from the group consisting of alums, aluminum sulphate, and magnesium sulphate, a soluble iodide is associated with iodine in said aqueous dispersion, and the proportioning of the liquid and solid materials employed is such that the final product is substantially dry.

4. The process of preparing an iodine-containing composition for local application, which comprises subjecting to the hydrating action of a separately prepared aqueous dispersion of iodine and a water-dispersible gum, a hydratable inorganic water-soluble sulphate in a relatively low state of hydration which undergoes setting in passing to a higher state of hydration and which is substantially inert chemically toward iodine, and forming a shaped body of the resultant mixture before the setting action is complete.

5. The process of preparing an iodine-containing composition for local application, which comprises commingling a separately prepared aqueous dispersion of iodine and a solid hydratable styptic inorganic salt that is chemically inert toward iodine and in a low state of hydration, thereby hydrating said styptic salt and dispersing the iodine therethrough, the ingredients being so proportioned as to give a substantially dry product.

6. The process of preparing an iodine composition in form suitable for local application, which comprises hydrating burnt alum by commingling therewith a separately prepared aqueous solution containing elemental iodine, the quantity of solution employed being such that the final product is substantially solid.

7. The process of preparing an iodine composition in form suitable for local application, which comprises commingling burnt alum with a separately prepared aqueous solution of iodine and a soluble iodide, in proper proportions to give a substantially dry final product.

8. The process of preparing an iodine composition in form suitable for local application, which comprises commingling burnt alum with a separately prepared aqueous solution of iodine and a soluble iodide, in proper proportions to give a substantially dry final product, and cooling the mixture during the hydrating reaction.

9. The process set forth in claim 8, which further includes forming the mixture into a shaped body before it has fully set.

10. The process of preparing an iodine composition in form suitable for local application, which comprises commingling burnt alum with a separately prepared aqueous solution of iodine and potassium iodine, in proper proportions to give a substantially dry solid reaction product.

11. A substantially dry medicament composition comprising the combination, with a water-soluble hydrated salt chemically inert toward iodine, of elemental iodine, together with a soluble iodide, uniformly distributed therethrough and blended therewith in intimate and substantially stable association with the water of hydration of said salt.

12. A substantially dry medicament composition comprising the combination, with a water-soluble hydrated salt chemically inert toward iodine, of elemental iodine uniformly distributed therethrough and blended therewith in readily water-soluble condition, in intimate and substantially stable association with the water of hydration of said salt.

13. A substantially dry medicament composition comprising an alum in hydrated, set condition carrying elemental iodine uniformly distributed therethrough and blended therewith in intimate and substantially stable association with the water of hydration of said alum.

14. An antiseptic styptic pencil comprising a shaped body of an alum in hydrated, set condition carrying elemental iodine and a soluble iodide, together with a binder, uniformly distributed therethrough and blended therewith in intimate and substantially stable association with the water of hydration of said alum.

ROBERT BRUCE GOODRICH.